United States Patent [19]
Van Gelderen

[11] Patent Number: 4,655,475
[45] Date of Patent: Apr. 7, 1987

[54] STEERING COLUMN FOR A MOTOR VEHICLE

[75] Inventor: Glenn P. Van Gelderen, W. Bloomfield, Mich.

[73] Assignee: Ford Motor Company, Dearborn, Mich.

[21] Appl. No.: 782,622

[22] Filed: Sep. 30, 1985

[51] Int. Cl.⁴ .............................................. B62D 1/18
[52] U.S. Cl. ..................................... 280/777; 74/492; 180/78; 280/779
[58] Field of Search ............... 280/750, 771, 775, 777, 280/779, 780; 180/78; 74/192

[56] References Cited

U.S. PATENT DOCUMENTS

| | | | |
|---|---|---|---|
| 3,505,897 | 4/1970 | Scheffler et al. | 280/777 |
| 3,923,319 | 12/1975 | Nonaka et al. | 280/777 |
| 3,934,896 | 1/1976 | Barenyl | 280/777 |
| 3,948,539 | 4/1976 | Murase et al. | 280/777 |
| 3,988,027 | 10/1976 | Serizawa et al. | 280/777 |
| 4,022,495 | 5/1977 | Pizzocri | 280/750 |
| 4,241,937 | 10/1980 | Eggen et al. | 280/777 |
| 4,330,139 | 5/1982 | Katayama | 280/777 |
| 4,365,825 | 12/1982 | Merkle | 280/777 |
| 4,400,990 | 8/1983 | Cook et al. | 74/492 |

Primary Examiner—John J. Love
Assistant Examiner—Kenneth R. Rice
Attorney, Agent, or Firm—Jerome R. Drouillard; Roger L. May

[57] ABSTRACT

A steering column system for a motor vehicle comprises a steering column including a steering wheel, a mounting structure attached to the steering column and pivoted about a generally horizontal axis to the chassis of the vehicle and means interposed between the chassis of the motor vehicle and the mounting structure for rotating the mounting structure in a forward direction when the forward portion of the chassis of the vehicle is displaced rearwardly with respect to the steering column by the force of a collision. The means for rotating the mounting structure preferably comprises a bellcrank and rigid link, with the bellcrank pivoted to the chassis, to the mounting bracket and to the rigid link, which is further preferably attached to the dash panel of the vehicle.

16 Claims, 6 Drawing Figures

STEERING COLUMN FOR A MOTOR VEHICLE

BACKGROUND OF THE INVENTION

1. Field of the Invention

This invention relates to a steering column system for a motor vehicle.

2. Disclosure Information

Protection of the driver of a motor vehicle in the event of a frontal impact usually includes consideration of the driver's interaction with the steering column system. In a typical frontal collision the initial impact upon the front of the vehicle will be followed by an impact by the driver upon the steering column system. Automotive designers have attempted to mitigate the effects of these secondary impacts by building energy absorbing capability into steering column systems. One aspect of this energy absorbing capability addresses the location of the driver vis-a-vis the steering wheel. More specifically, various designs have allowed the steering wheel and its supporting structure to telescope axially forward or to rotate downward or upward when impacted by the driver. Examples of passive systems for rotating the steering column and steering wheel in the event of a collision are disclosed in U.S. Pat. Nos. 3,923,319 and 4,022,495. These systems are passive because rotation of the steering column and steering wheel in a desired fashion does not occur until the driver strikes the steering wheel. This phenomenon may be undesirable inasmuch as the driver's body will be subjected to considerable force to achieve the desired rotation of the steering column assembly.

A form of active rotational or tiltable steering column is disclosed in U.S. Pat. No. 3,988,027, in which explosive bolts are used to attach the steering column mounting bracket in the vicinity of the vehicle's dash panel. This system suffers from the problems associated with the use of pyrotechnic devices inside passenger compartments such as potential misfires, unreliable operation of electronic systems, and hazards to vehicle recyclers.

Designers have paid particular attention to energy absorbing arrangements incorporated into mounting hardward for a steering column. Examples of energy absorbing mounting arrangements are disclosed in U.S. Pat. Nos. 4,022,495 and 4,241,937. Each suffers from the problems faced by other passive devices in which desired repositioning of the steering column in the event of a collision is accomplished at the expense of energy absorbed by the driver's body.

U.S. Pat. No. 3,934,896 discloses an active system for repositioning the steering column in the event of rearwardly directed deformation forces in the area of the vehicle's front axle. Because this system relies on the steering drive shaft as part of its operating linkage, it is not suitable for use with steering systems in which the intermediate shaft extending between the steering column and the steering gear does not lie in the same vertical plane with the steering column and the point at which the intermediate shaft is attached to the steering gear. The system disclosed in the U.S. Pat. No. 3,934,896 is relatively inefficient in any event because considerable axial deformation will be required to effect the desired change in steering column inclination and parts of the system would be quite large and bulky. The U.S. Pat. No. 3,934,896 discloses another embodiment in which a linkage attached forward of the front wheel of the vehicle and slightly above the centerline of the wheel is pushed rearward and up to cause the steering wheel to rotate to a more vertical position. This embodiment will require a comparatively bulky and heavy structure for its operation which will depend upon axial displacement of a relatively great magnitude because of the disclosed rotational relationship between the steering column and the linkage mechanism.

U.S. Pat. No. 4,365,825 discloses a steering wheel mounting system in which the steering column is displaceable to a protective position during a collision or sudden deceleration. This system requires a substantial linkage which is complicated, high in weight, and not suitable for light duty vehicles.

U.S. Pat. No. 4,400,990 discloses a steering column assembly including a passive system which simultaneously allows axial deformation and radial movement to the upper steering shaft in the event of a collision.

Finally, U.S. Pat. No. 4,241,937 discloses a steering column support including a cantilevered beam mounted on the hinge pillar of the chassis. This too, is a passive device which will change its position only when struck by the driver's body during a collision.

It is an object of the present invention to provide a steering column system for a motor vehicle which beneficially rotates the steering column downward in the event of a frontal collision accompanied by rearward displacement of the vehicle's dash panel.

It is another object of the present invention to provide a steering column system for a motor vehicle including an active rotation device for beneficially rotating the steering column downward in the event of a frontal collision.

It is a still further object of the present invention to provide a steering column system for a motor vehicle which, in the event of a collision, will cause the steering column mounting bracket to be rotated forward to a further extent than that extent to which the dash panel of the vehicle is displaced rearward relative to the steering column system.

It is yet another object of the invention to provide a steering column system characterized by the aforementioned repositioning capability during collisions, in a system which is compact and light in weight.

SUMMARY OF THE INVENTION

The motor vehicle steering column system of the invention comprises a steering column and associated steering wheel, a mounting structure attached to the steering column pivoted about a generally horizontal axis to the chassis of the vehicle and means interposed between the chassis and the mounting structure for rotating the mounting structure forward when the forward portion of the chassis is displaced rearward by the force of a collision, in order that the steering column will be displaced downwardly. The mounting structure is preferably attached to the steering column is rigid fashion and pivoted such that its axis of rotation runs generally transverse of the motor vehicle. The steering column mounting structure is preferably pivoted to the cowl beam of the chassis but could be mounted to another hard point of the vehicle chassis.

Means for rotating the steering column downward in the event of a collision preferably comprises a linkage mechanism interposed between the dash panel and steering column mounting bracket. The linkage system preferably comprises a bell crank pivoted to the column mounting bracket for rotation in a horizontal plane and a rigid link interposed between the dash panel and the bellcrank. The bellcrank may alternatively be pivoted to the chassis for rotation in a vertical plane. The bellcrank is preferably pivoted to the chassis of the vehicle in an area such as a door hinge pillar. Two legs are preferably incorporated into the bellcrank. The first leg runs from the mounting pivot of the bellcrank to the steering column mounting bracket; the second leg runs from the chassis mounting pivot to a rigid link interposed between the dash panel and the bellcrank. Inasmuch as the two legs of the bellcrank need not be equal in length, a multiplying effect is available wherein the movement transmitted to the bellcrank by the rigid link may be magnified or multiplied before it is supplied to the steering column mounting bracket.

The system of the present invention produces a beneficial displacement of the steering column in the downward direction in the event of a frontal collision through the employment of means which are compact in terms of their dimensions and light in weight.

DESCRIPTION OF THE PREFERRED EMBODIMENTS

As shown in the various Figures, the present invention is concerned with a system for mounting the steering column in a motor vehicle. During serious accidents in which the front of the vehicle impacts upon another vehicle or other object, the front body structure of the vehicle will be collapsed. This collapse is marked by crushing of various components such as the hood, fenders, inner fenders and frame rails. Rearward displacement of these components as well as the dash panel will occur in particularly serious accidents. The steering column system of the present invention utilizes rearward movement of the dash panel to cause a beneficial downward rotation of the steering column.

Figure 1:
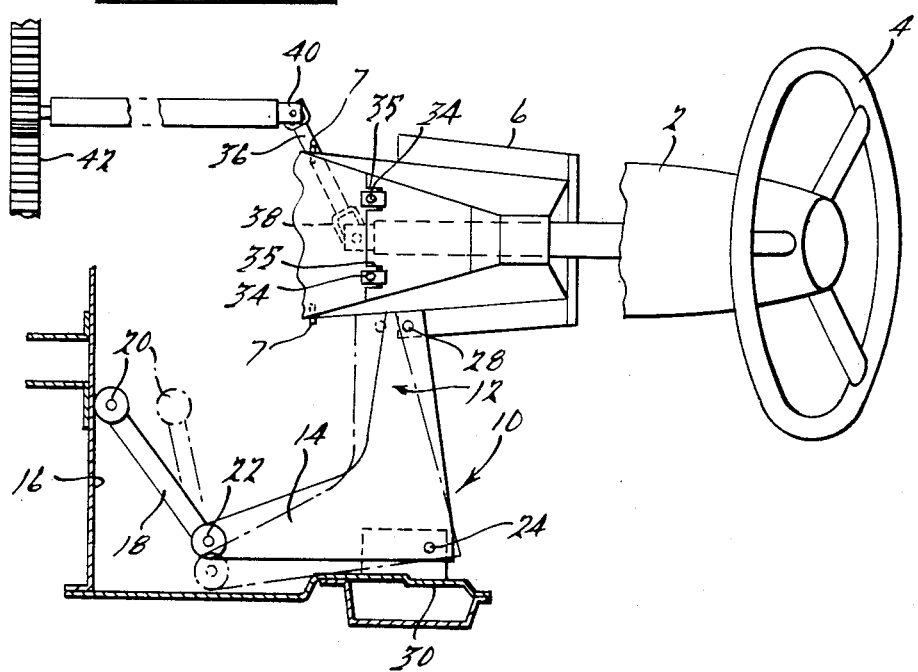
FIG. 1 is a plan view, partially cut away, of a first embodiment of the steering column system of the present invention.
Figure 2:
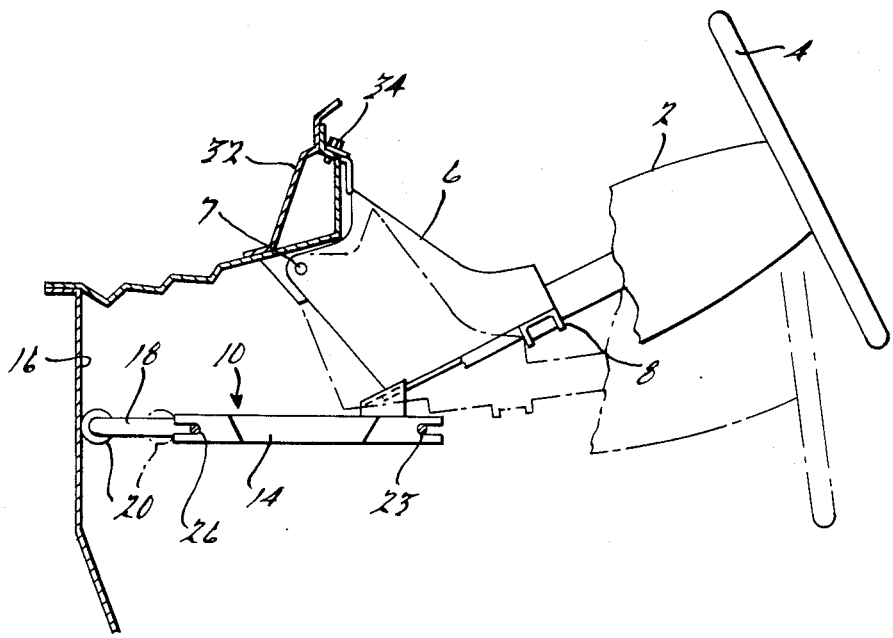
FIG. 2 is a side elevation, partially cut away, of the steering column system shown in FIG. 1.

It is desirable for the steering column to be displaced downwardly in the event of a collision in order that the driver's head will not impact the steering wheel. Unlike several prior art systems, the arrangement of the present invention provides an active system utilizing forces and motion available during a collision to rotate the steering column downward by means of a novel, compact linkage mechanism. As shown in FIGS. 1 and 2, the steering column system of the present invention is intended for use with a steering column 2 having a steering wheel 4 attached at one end. Mounting bracket 6 is firmly attached to steering column 2 and supports the column in a fixed position during normal driving conditions. Column retaining strap 8 is of conventional construction and firmly attaches steering column 2 to mounting bracket 6. In each of FIGS. 1-4, common reference numerals have been used to refer to the component parts of the steering column system of the present invention.

Mounting bracket 6 is preferably formed of stamped metal, in this case, mild steel, but could be made of any material such as other cast or stamped ferrous or non-ferrous metals or plastic composite materials. Mounting bracket 6 is pivoted to cowl beam 32 which runs transversely to the driver's side and passenger's side of the vehicle. Two pivots 7 lying along a common axis attach mounting bracket 6 to the cowl beam. Those skilled in the art will appreciate in view of this disclosure that mounting bracket 6 could be pivoted to other hard points within the vehicle chassis other than the cowl beam. For example, a special pedestal could be fabricated for the purpose of supporting the mounting bracket. Alternatively, the mounting bracket could be attached to a dash panel extension of the vehicle or some other structure running transversely of the vehicle. Mounting bracket 6 is restrained from rotating about the axis of pivots 7 in the normal course of driving by bolts 34 which provide frictional engagement between the upper portion of mounting bracket 6 and the upper portion of cowl beam 32. Although bolts 34 are shown as passing through slots 35 in bracket 6 and as having frictional engagement with mounting bracket 6, those skilled in the art will appreciate in view of this disclosure that other means could be used to attach the upper portion of the mounting bracket 6 to cowl beam 32. Such means could include welding, or other means of mechanically fastening these components. In any event, it is preferable that mounting bracket 6 be restrained against rotation except in the event that a collision occurs.

During a collision having forces of sufficient magnitude to collapse the frontal portion of the vehicle with such force as is necessary to activate the system of the present invention, mounting bracket 6 will be rotated forward about pivots 7 by the action of bellcrank 10, link 18, and dash panel 16.

Figure 3:
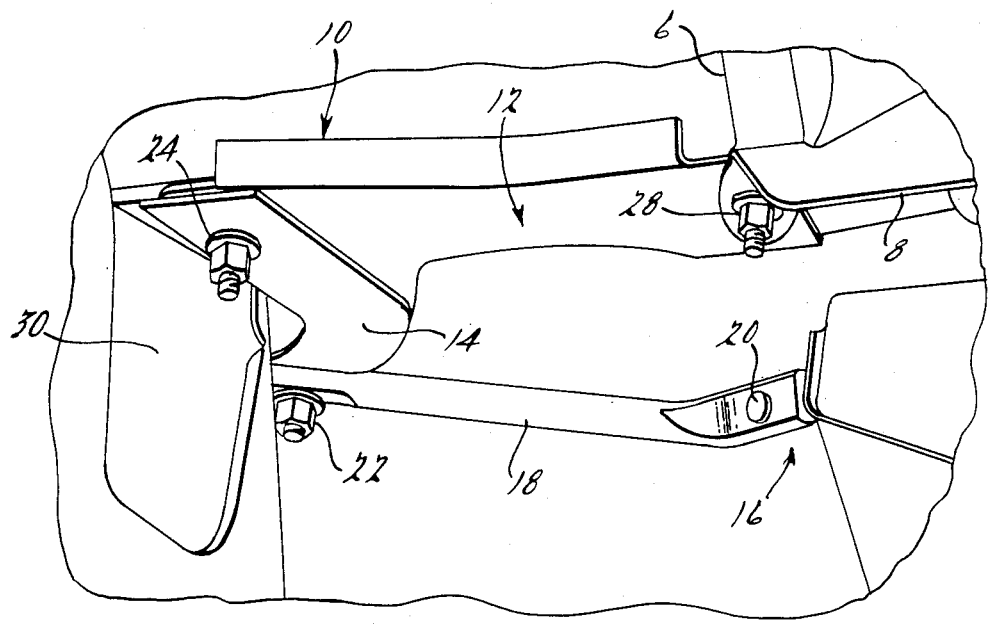
FIG. 3 is a perspective view of a portion of a first embodiment of the present invention including first fastening means for the bellcrank.
Figure 4:
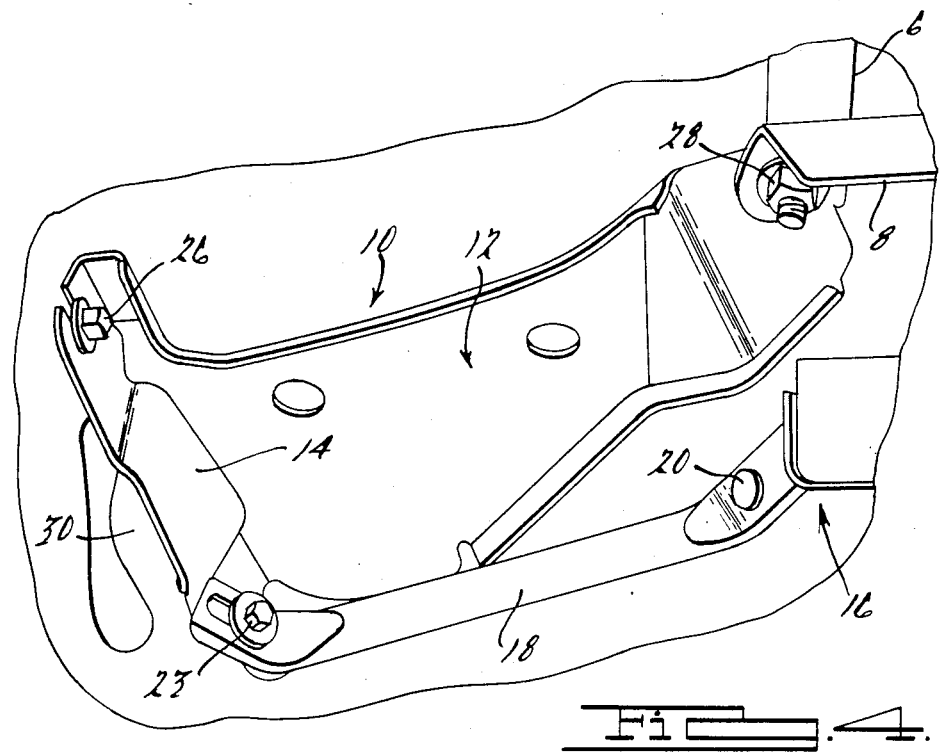
FIG. 4 is a perspective view of a portion of a first embodiment of the present invention including second fastening means of the bellcrank.

Bellcrank 10 is attached to the motor vehicle chassis in the area of door hinge pillar 30. As shown in FIG. 1, a door hinge pillar is a box section providing adequate support for the bellcrank which must be permitted to rotate in a horizontal plane. As shown in FIG. 3, bellcrank 10 may be pivoted to hinge pillar 30 by means of a bolted fastener 24. This arrangement allows bellcrank 10 to pivot in a horizontal plane about the vertical axis created by fastener 24. As shown in FIG. 4, fastener 26 may be used to attach bellcrank 10 to hinge pillar 30. With this second arrangement, bellcrank 10 is relatively more constrained but nevertheless free to pivot generally about fastener 26 in a horizontal plane by plastically deforming the material of hinge pillar 30 as well as the surrounding body sheet metal and the bellcrank itself.

Each bellcrank 10 has two legs. First leg 12 runs from pivot 24 or fastener 26 to pivot 28 which attaches the first leg to mounting bracket 6. Although pivot 28 is shown as a bolted fastener those skilled in the art will, in view of this disclosure, recognize that other means could be used for this pivot as well as for the pivots formed by fastener 24 and fastener 22. The second leg of the bellcrank as shown in FIG. 3 lies between pivots 22 and 24 and in FIG. 4 between attachment points 23 and 26. It can be seen from the figures that the bellcrank performs an additional function of stabilizing the steering column assembly with respect to laterally directed movement and vibration. Thus, the bellcrank can be said to be a lateral shake brace.

Bellcrank 10 is used to good advantage in the present invention because the length of its legs can be altered to achieve the desired response characteristics of the mounting system in the event of a frontal crash. More specifically, as shown in the drawings, the first leg, 14, may be longer than the second leg, 12, and as a result, motion imparted to the bellcrank by link 18 will be magnified and multiplied by the bellcrank to a greater motion applied at pivot 28 to mounting bracket 6. The bellcrank may thus function as a multiplier of motion. In the event that multiplication of the motion is not required for a particular application, the bellcrank's legs may be of equal length. Moreover, leg 14 could be shorter than leg 12, in which case a reduction in the motion will occur.

Link 18 transmits the necessary force and motion inputs from the collapsing vehicle chassis to operate the present system. The link preferably comprises a rigid rod interposed between dash panel 16 and bellcrank 10. Those skilled in the art will, in view of this disclosure, appreciate that link 18 could comprise many types of construction including solid or tubular beams, stamped or formed by other means, of a variety of materials such as ferrous or nonferrous metals, or plastic composites. Link 18 has two ends 20 and 22. End 20 is attached to dash panel 16. Although FIG. 1 shows end 20 as having a pivoted attachment to dash panel 16. FIGS. 3 and 4 show the link as being rigidly fastened to dash panel 16. It has been found that the system of the present invention works equally well with either configuration, and it is probable that other fastening modes between link end 20 and dash panel 16 will function properly for purposes of the present invention. End 22 of link 18 is pivoted to bellcrank 10. As shown in FIGS. 1 and 2, end 20 of link 18 is displaced rearwardly in the event of a severe frontal collision. Because link 18 is rigid, end 22 of the link displaces leg 14 of the bellcrank outboard as shown in FIG. 1. This outboard motion is translated by the bellcrank into forward motion of leg 12, as shown by the dotted lines in FIG. 2. This forward motion is imparted to mounting bracket 6 and the mounting bracket, as shown in FIG. 2, is moved forwardly as it rotates about the axis defined by pivots 7. Steering column 2 is displaced downwardly as mounting bracket 6 rotates forward. Thus, the steering column which is normally inclined at an acute angle to a horizontal plane passing through the base of the column moves to a position so as to lessen the magnitude of this acute angle.

The previously described rotation of mounting bracket 6 is accompanied by the slipping of bracket 6 with respect to bolts 34 which clamp bracket 6 to cowl beam 32 with sufficient force to prevent unwanted rotation of bracket 6 during normal vehicle operating conditions.

Because the present steering column system has the capability of multiplying the initial rearward motion imparted to link 18 through the action of bellcrank 10, it is possible to achieve satisfactory downward movement of the steering column with relatively lesser displacements of the dash panel or other chassis structures. In this regard, in view of this disclosure it will be apparent to those skilled in the art that link 18 could be interposed between bellcrank 10 and any chassis part subject to rearward displacement relative to the vehicle's steering column. Because the present system will operate satisfactorily with limited longitudinal displacement, the system can be compact and light in weight because it need not be coupled to a chassis structure which will undergo a relatively great displacement during a frontal collision. The present system thus offers a specific advantage over prior art systems which must be coupled to chassis portions subject to relatively greater longitudinal displacement during frontal collisions. These chassis sections are frequently located a greater distance from the steering column than is the dash panel, and as a result system weight and complexity increases with the need to accommodate such distances. Another advantage of the present invention resides in the fact that, unlike certain prior art systems, such as that of U.S. Pat. No. 3,934,896, this system may be employed with steering arrangements in which the intermediate shaft extending between the steering column and the steering gear does not lie in the same vertical plane as the steering column and the point at which the intermediate shaft is attached to the steering gear. FIG. 1 further illustrates such a steering system embodying the present invention in which steering column 2 is connected to a steering gear 42 by means of an intermediate shaft 36 having universal joints 38 and 40 at either end. Because the steering column, the intermediate shaft, and the point at which the intermediate shaft attaches to the steering gear do not lie within the same vertical plane, the steering gear would only rotate the intermediate shaft about universal joint 38 if the steering gear were displaced rearwardly during a collision. Accordingly, the intermediate shaft could not be used to control movement of the steering column during a collision.

Figure 5:
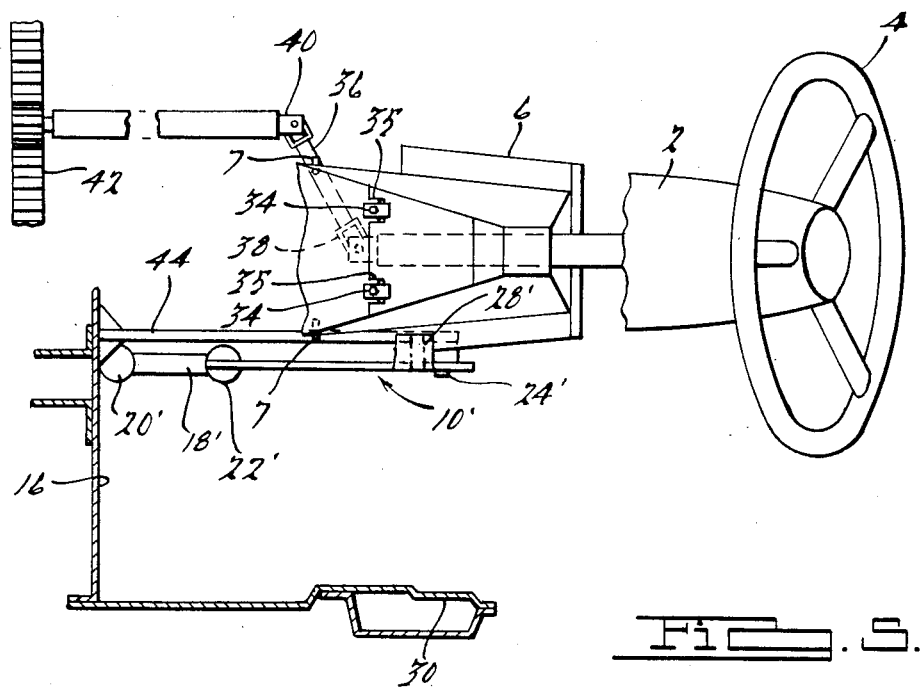
FIG. 5 is a plan view, partially cut away, of a second embodiment of the steering column system of the present invention.
Figure 6:
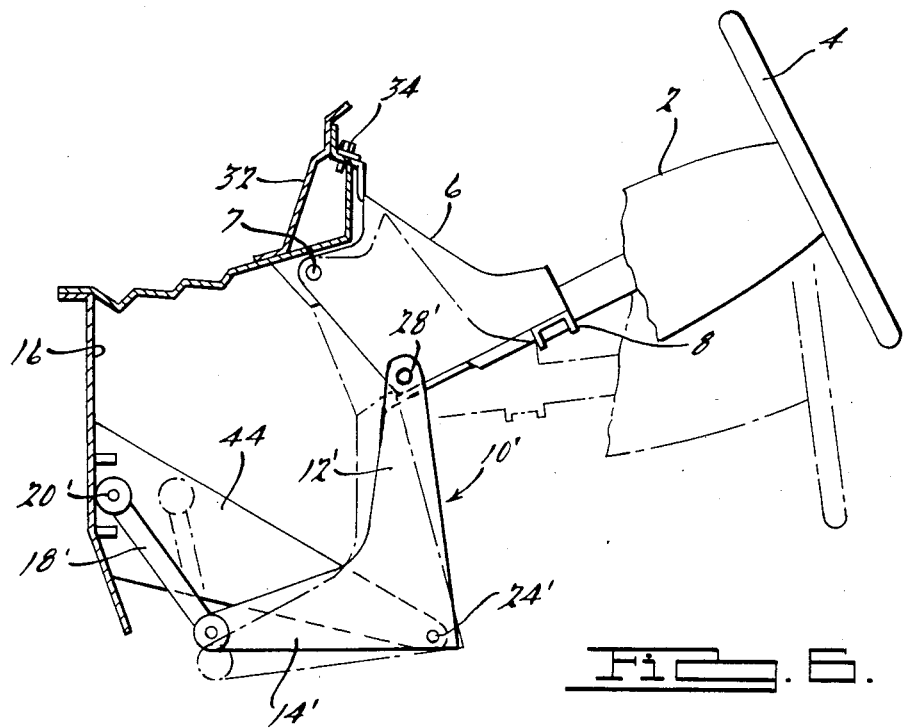
FIG. 6 is a side elevation, partially cut away, of the steering column system shown in FIG. 5.

FIGS. 5 and 6 illustrate a second embodiment of the present invention in which the bellcrank is located for rotation in a vertical plane. The reference numerals employed with FIGS. 1–4 have been retained for FIGS. 5 and 6; those numerals pertaining to the bellcrank have been modified with the addition of a prime notation. As with the first embodiment, link 18' is interposed between one leg of the bellcrank 14' and the dash panel. The other leg, 12', is pivoted to column mounting bracket 6' and functions as before to rotate the lower portion of the bracket forward during a collision so as to rotate steering column 2' downward. The bellcrank may be mounted to any convenient chassis structure providing a secure position for rotation about a generally horizontal, transverse axis. FIGS. 5 and 6 show the bellcrank as being pivoted to bracket 44 extending rearwardly from the dash panel. In view of this disclosure, those skilled in the art will appreciate that there will be other configurations possible for the mechanism of the present invention.

The foregoing description presents the presently preferred embodiment of this invention. Alterations and modifications may occur to those skilled in the art which will come within the spirit and scope of the following claims.

I claim:

1. A motor vehicle steering column system comprising:

a steering column including a steering wheel;

a mounting structure attached to said steering column and pivoted about an axis generally horizontal to the chassis of said vehicle; and means interposed between the chassis of said motor vehicle and said mounting structure for rotating said mounting structure in a forward direction when the forward portion of the chassis of said vehicle is displaced rearwardly with respect to said steering column by the force of a collision, whereby said steering column is displaced downwardly.

2. The steering column system according to claim 1 wherein said mounting structure is rigidly attached to said steering column.

3. The steering column system according to claim 1 wherein said generally horizontal axis runs generally transverse of said motor vehicle.

4. The steering column system according to claim 1 wherein said mounting structure is pivoted to the cowl beam of said chassis.

5. The steering column system according to claim 1 wherein said means for rotating said mounting structure in a forward direction is interposed between the dash panel of said vehicle and said mounting structure.

6. A motor vehicle steering column system comprising:
   a steering column inclined at an acute angle to a horizontal plane passing through the base of said column;
   a mounting bracket rigidly attached to said steering column and pivoted to the cowl beam of said vehicle for rotation about a generally horizontal axis; and
   a linkage interposed between the dash panel of said motor vehicle and said mounting bracket for rotating said mounting bracket and said steering column about said generally horizontal axis in a direction so as to lessen the magnitude of said acute angle in response to rearward displacement of said dash panel relative to said cowl beam, said linkage comprising a bellcrank pivoted to said mounting bracket and a rigid link interposed between said bellcrank and said dash panel.

7. The steering column system according to claim 6 wherein said bellcrank is pivoted to the chassis of said motor vehicle for rotation in a generally vertical plane, with said bellcrank having one leg pivoted to said mounting bracket and another leg pivoted to a rigid link interposed between said dash panel and said bellcrank.

8. The steering column system according to claim 1 wherein said bellcrank is attached to the chassis of said motor vehicle for rotation in a generally horizontal plane.

9. The steering column system according to claim 8 wherein said bellcrank is pivoted to the chassis of said vehicle.

10. The steering column system according to claim 9 wherein said bellcrank is pivoted to a door hinge pillar comprising part of said chassis.

11. The steering column system according to claim 8 wherein said bellcrank is rigidly attached to the chassis of said vehicle.

12. The steering column system according to claim 11 wherein said bellcrank is mounted to a door hinge pillar comprising part of said chassis.

13. A steering column system for a motor vehicle comprising:
   a steering column inclined at an acute angle to a horizontal plane passing through the base of said column;
   a mounting bracket rigidly attached to said steering column and attached to the cowl beam of said motor vehicle by a first means comprising a pair of pivots arranged along a common axis substantially horizontal and transverse of said motor vehicle and second means for restraining said mounting bracket from rotating about said pivot axis, whereby said steering column will be maintained at said acute angle in the absence of a frontal collision of said motor vehicle; and
   a bellcrank pivoted to the chassis of said motor vehicle, said bellcrank comprising a first leg pivoted to said mounting bracket and a second leg pivoted to a rigid link interposed between said bellcrank and said dash panel whereby said rigid link and said bellcrank will rotate said mounting bracket forward when said dash panel is displaced rearwardly, thereby decreasing the magnitude of said acute angle.

14. The steering column system according to claim 13 wherein said rotation of said bellcrank is accompanied by plastic deformation of said bellcrank and that portion of said chassis to which said bellcrank is mounted.

15. The steering column system according to claim 14 wherein said means for restraining said mounting bracket from rotating about said pivot axis comprises one or more fasteners slidably engaged with slots formed in said mounting bracket.

16. The steering column system according to claim 13 wherein said first leg of said bellcrank is longer than said second leg, whereby the rearward displacement of said dash panel communicated to said second leg by said rigid link will be multiplied by a factor greater than unity and translated into forward motion of said first leg and said mounting bracket.

* * * * *